United States Patent [19]

Walter et al.

[11] Patent Number: 4,708,514
[45] Date of Patent: Nov. 24, 1987

[54] RESILIENT SHAFT COUPLING

[75] Inventors: Jurgen Walter, Haltern-Hullern; Ulrich Falz; Manfred Lunke, both of Dortmund, all of Fed. Rep. of Germany

[73] Assignee: Hackforth G.m.b.H. & Co. KG, Herne, Fed. Rep. of Germany

[21] Appl. No.: 776,603

[22] Filed: Sep. 16, 1985

[30] Foreign Application Priority Data

Sep. 21, 1984 [DE] Fed. Rep. of Germany ....... 3434722

[51] Int. Cl.⁴ ................................................. F16D 3/56
[52] U.S. Cl. ...................................... 403/372; 464/92; 464/96; 403/220; 403/41
[58] Field of Search ............... 403/220, 335, 336, 337, 403/257, 258, 259, 372, 41; 464/94, 96, 98, 99, 92

[56] References Cited

U.S. PATENT DOCUMENTS

| | | | |
|---|---|---|---|
| 424,304 | 3/1890 | Jones | 403/336 X |
| 1,639,644 | 8/1927 | Baumann | 403/336 X |
| 2,444,904 | 7/1948 | Worley | 464/92 |
| 2,742,769 | 4/1956 | Gleeson et al. | 464/92 |
| 3,039,281 | 6/1962 | Hartz | 464/96 |
| 3,988,907 | 11/1976 | Bohm et al. | 464/96 |
| 4,011,021 | 3/1977 | Hartz | 403/41 |
| 4,214,457 | 7/1980 | Wade et al. | 403/335 X |
| 4,563,166 | 1/1986 | Walter et al. | 464/92 X |

FOREIGN PATENT DOCUMENTS 3109388 9/1982 Fed. Rep. of Germany .
879325 2/1943 France ................................. 464/92

Primary Examiner—Richard J. Scanlan, Jr.
Assistant Examiner—Joseph A. Fischetti
Attorney, Agent, or Firm—Thomas H. Murray; Clifford A. Poff

[57] ABSTRACT

A highly-resilient shaft coupling includes a hub for rotating about a longitudinal axis, a drive ring, a resilient ring assembly including two axially-continuous circular ring parts bearing radially on the hub. Each ring part includes elastomeric ring sectors and ring sector plates adhered to opposite axial ends of each elastomeric ring sector. An elastomeric ring sector of one circular ring part spans parts of two elastomeric ring sectors of the other ring part. A drive ring drivingly interconnects the hub and the resilient ring assembly at one axial end thereof. Fastener means secure together the ring sector plates at one axial end of each of the two circular ring parts, in a confronting relation. Passageways for cooling air extend between the ring sectors which are secure together. A coupling part is secured to one of the ring sectors at the end which is opposite the drive ring.

7 Claims, 3 Drawing Figures

RESILIENT SHAFT COUPLING

BACKGROUND OF THE INVENTION

This invention relates to a resilient coupling to join together machine elements in a driving relation and, more particularly, to a coupling which includes a hub on which there is carried a resilient ring assembly including two axially-contiguous circular ring parts bearing radially on the hub with each ring part including elastomeric ring sectors and ring plates adhered to opposite axial ends of each elastomeric ring sector so that an elastomeric ring sector of one circular ring part can be secured to and span parts of two elastomer ring sectors of the other ring part for transmitting a driving force between a drive ring interconnecting the hub and the resilient ring assembly and coupling part secured to an end of the ring sectors which is opposite the drive ring.

A coupling is a device that connects two shafts end-to-end. A flexible, or resilient, coupling is used when accurate lineal alignment of the shafts is not possible. A flexible coupling allows for a certain amount of misalignment as well as acting as a shock absorber for vibrations and jerks in torque transmission. Such a coupling is useful for any application in which one shaft is driven to rotate at a certain angular velocity, and it is desired for the second shaft to rotate at the same velocity, but perfect alignment between the two shafts is not possible.

In West German Patent Publication DE No. 31 09 388 there is disclosed a resilient shaft coupling in which a resilient intermediate member is provided for interconnecting two rigid coupling parts, the resilient intermediate member takes take the form of two parallel and connected inner ring elements and a consecutively-arranged outer ring element. The series or consecutive connection of ring elements in a coupling arrangement of this type produces correspondingly large dimensions to the coupling in the plane of the diameter thereof. An axially-adjacent arrangement of ring elements in a consecutive driving relationship is known but the ring elements disposed axially after the first ring element must be supported radially by an external metal member which is rigidly connected to one of the two coupling parts. Usually ring elements are connected to the drive part. The moment of inertia of the mass of the coupling increases as the number of consecutively-disposed resilient ring elements increases and, therefore, the length of the outer part increases. This is a characteristic which is undesirable for various reasons. Also, the use of a metal outer part, which extends around resilient ring elements, increases the difficulty of replacing individual components of the coupling.

SUMMARY OF THE INVENTION

It is, therefore, an object of the present invention to provide a highly resilient shaft coupling such that any number of resilient ring elements can be disposed in an axially-consecutive relationship while not thereby increasing the moment of inertia of the mass on the drive side of the coupling due to the need for a consecutively arranged outer ring element.

The coupling of the present invention includes a hub for rotating about a longitudinal axis, a drive ring, a resilient ring assembly including two axially contiguous circular ring parts bearing radially on the hub, each ring part including elastomeric ring sectors and ring sector plates adhered to opposite axial ends of each elastomeric ring sector, an elastomeric ring sector of one sector of the ring part spanning parts of two elastomeric ring sectors of the other ring part, a drive ring drivingly interconnecting the hub and the resilient ring assembly at one axial end thereof to rotate about the axis, fastener means for securing together the ring sector plates at one axial end of each of the two circular ring parts in a confronting relation, and a coupling part secured to one of the ring sectors at an end which is opposite the drive ring.

Thus, according to the present invention, the resilient ring assembly is made up of at least two axially-contiguous identical ring parts with ring sectors of the two ring parts offset from one another by preferably half the pitch of a ring sector. The axially inner ring sector plates are clamped together at their outer edges by means of, for example, threaded fasteners. The plates of the ring sectors bear radially and centrally by way of their inside edges on the hub of the coupling.

The resilient ring assembly according to the present invention provides a number of advantages. For example, the fact that the inner ring sector plates bear radially on the hub, eliminates the need for an additional metal outer part. Also, the coupling of the present invention enables the use of shorter individual axial lengths of the elastomeric members which is a basic consideration for the highest permissible speed of rotation. The resulting decrease in torsional resilience can readily be compensated for by a series arrangement of a corresponding number of identical resilient ring assemblies. The invention, therefore, provides a simple solution to the problem of two contradictory requirements for highly-resilient shaft couplings of this type, namely, high rotational resilience and the highest possible speed of rotation.

Conveniently, to improve the torsional mobility of the inner ring sector plates relative to the hub which they radially surround a bearing sleeve is disposed on the outer periphery of the hub. Also, it is advantageous inter alia from the aspect of production engineering, to avoid the use of the entire inner peripheral edge of sector plates to bear radially on the hub by forming radially-projecting webs that bear radially on the hub.

Another development arising out of the present invention is to provide satisfactory cooling of the resilient ring sectors and thus considerably increase the heat load to which the ring elements can be subjected. According to the prevent invention, a radial gap is established at the joints between the sector plates. This is made readily possible because of the staggered arrangement of the sector plates which are individually clamped together leading to an inherently rigid ring. In addition to the radial gaps between end faces of the sector plates, other ducts for cooling air are provided in the peripheral direction between the continuous inner sector plates. A simplified embodiment of this feature provides that the opposed walls of the inner sector plates are formed with recesses having a large area which extends from one end face edge to the opposite end face edge of a sector plate. Continuous ducts, consecutive in the peripheral direction of the sector plates, are provided for cooling air.

To achieve a satisfactory circulation of cooling air, the inner sector plates are formed on their outer peripheries with individual outlet slots which join the peripherally-extending ducts. Conveniently, for this purpose, the outer bearing surface of each inner sector plate is interrupted substantially at the center thereof by an indentation which extends the recess in this sector plate to the peripheral edge. Air enters axially during operation of the coupling, mainly at places relatively near the rotational axis through gaps between the end faces of two adjacent sectors into the inner ducts. The air is returned to atmosphere by a centrifugal force through the outer outlet slots. Automatic ventilation is, therefore, provided to ensure effective cooling of the inner sector plates and, therefore, also the adjacent resilient members.

These features and advantages of the present invention as well as others will be more fully understood when the following description is read in light of the accompanying drawings, in which:

Figure 1:
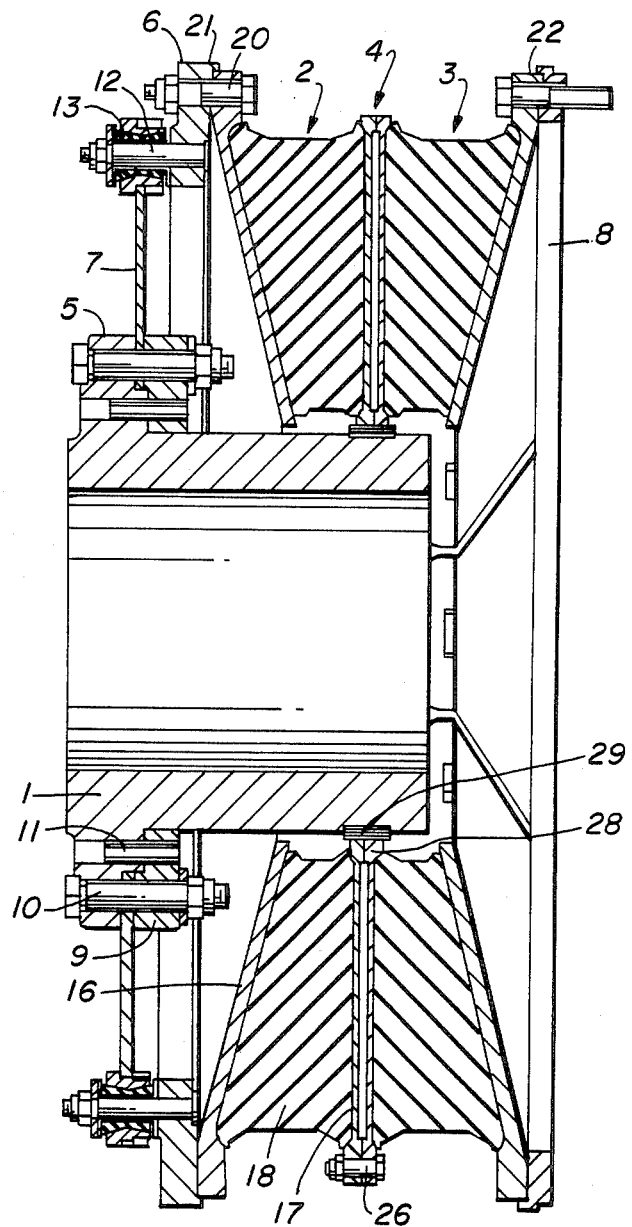
FIG. 1 is an axial view, in section, through the resilient shaft coupling of the present invention.
Figure 2:
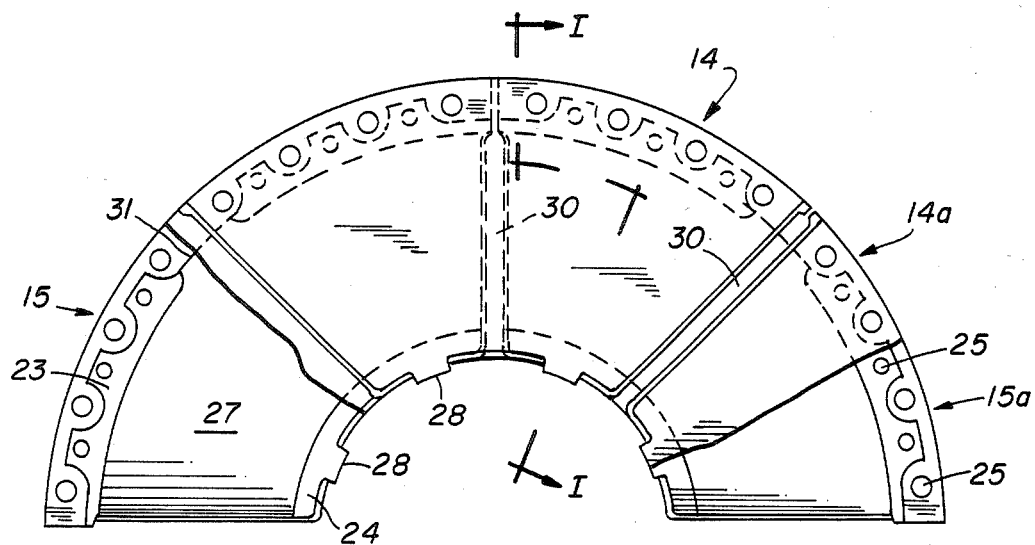
FIG. 2 is a partial side view of a four-part resilient ring assembly.
Figure 3:
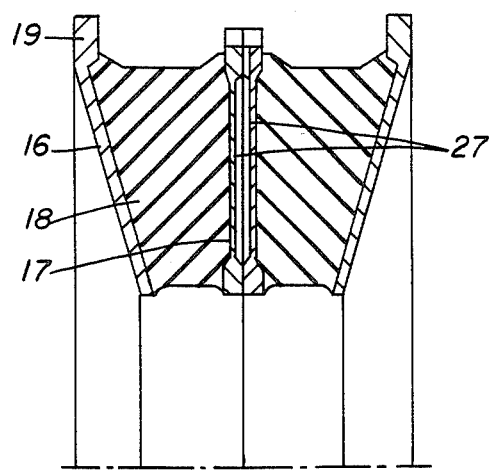
FIG. 3 is a sectional view taken along line I—I of FIG. 2.

In the embodiment of the shaft coupling of the present invention illustrated in FIGS. 1-3, a resilient ring assembly is constructed from two identical ring parts which are disposed in a laterally-inverted relationship to one another in relation to their boundary plane. A hub 1 forms a rigid coupling part at the input side of the coupling. The hub extends beyond the boundary planes of axially-contiguous circular ring parts 2 and 3 of the resilient ring assembly 4 in the interior of a coupling. A fixed flange 5 is formed on the outer end face of the hub 1. The flange is connected to a drive ring 6 for coaxial rotation with hub 1. A spring-steel diaphragm ring 7 drivingly interconnects flange 5 and ring 6. The ring 7 permits the hub 1 and a flange ring 8 which are rigid coupling parts to move in an axial direction relative to one another. A clamping ring 9 is provided to clamp the diaphragm 7 to the hub 1. Clamping bolts 10 are disposed in bores equidistantly distributed from one another about the periphery of the flange 5 and ring 9 to provide an axial clamping force on the diaphragm 7. Other registering continuous bores are provided on an inner circle in flange 5 and ring 9 to receive clamping sleeves 11 which together with bolts 10 serve to transmit torque between the flange 5 and ring 9. A number of continuous bores are formed on an inner circle in the ring 6. A connecting pin 12 is positively retained in these bores. The outer ends of pins 12 extend through limited resistant bearing elements 13 which are disposed on the outer periphery of the diaphragm ring 7. This construction enables bending of ring 7 in opposite directions without the risk of imposing transverse stresses on the pins 12 or ring 6.

The continuous circular ring parts 2 and 3 of the resilient ring assembly 4 each comprises four segments. In FIG. 2 there is shown a segment 14 and part of a sector or segment 14a of ring part 2 as well as two sectors or segments 15 and 15a of ring part 3. The assembly 4 as shown in FIG. 1 has the general cross-sectional shape of a trapezium which is known and provides a savings of material and, therefore, also weight. It will be observed that the zones of the ring parts near the rotational axis of the coupling receive less torque loading than the zones located more outwardly thereof in the assembly 4.

In the embodiment of the present invention illustrated in the drawings, there is a total of eight ring sectors 14, 14a, 15 and 15a which are identical to one another. Each sector comprises an axial outer sector plate 16, an axial inner sector plate 17 and a member 18 which is also in the form of a sector and interconnects the segment plates. Member 18 is made, for example, of rubber and vulcanized in a known manner onto the inside face surfaces of plates 16 and 17. A projecting circular peripheral flange segment 19 is formed externally on the axially outer sector plates 16. Opposed outer face surfaces of flange segment 19 extend parallel to the planes of the bearing surfaces of ring 6 and of ring 8. Fasteners such as threaded dowels 20 are provided to clamp the edge segments 19 of circular ring parts 2 to ring 6 and the edge segments 19 of circular ring parts 3 to ring 8. The dowels extend through bores which are aligned in the parts that are to be interconnected and for clamping purposes, the dowels each having a screw-threaded end which receives a nut member. Radially-projecting annular shoulders 21 and 22 are provided on rings 6 and 8, respectively, for centering the plates of the ring parts 2 and 3 relative to the rings 6 and 8, respectively.

Axially inner plates 17 of the ring parts are in confronting contact with one another by way of inner and outer radial edges which form outer and inner bearing surfaces 23 and 24 in parallel planes. The plates 17 are clamped together only by their outer bearing surfaces 23. In the zones of surfaces 23 there are peripherally-consecutive bores 25 extending parallel to the rotational axis of the coupling for receiving fasteners 26 such as clamping screw, bolts, or the like. In the walls of the plates 17 between surfaces 23 and 24, there is formed a recess 27 having a large area extending from one end face edge to the opposite end face edge. The outer surface 23 is interrupted at its center by an indentation 31 which extends the recess 27 as far as the peripheral edge of the plate. Radially projecting webs 28 are formed on the inside edge of the plate 17 and their free outside surfaces are disposed on a common circle. The ring parts 2 and 3 are concentric with the axis of rotation and bear radially on hub 1 by way of webs 28. Between the body of the hub 1 and the webs 28 is a bearing sleeve 29 engaged in a peripheral groove formed in the hub to prevent axial movement of the sleeve. The sleeve 29 serves to improve the slideability of the webs 28 when the rigid coupling parts, i.e., hub 1 and ring 8, move relative to one another both axially and in rotation.

The ring sectors 14, 14a, 15, and 15a of the two-ring parts 2 and 3 are clamped together in a position in which they are offset from one another by one-half the pitch of a sector. This relationship enables a rigid ring closed on itself to be provided without additional bearing or support rings. A radial end face gap 30 is formed at every junction of the ring sectors so that outside air can penetrate through the gaps 30 into the ducts which extend in the peripheral direction of the ring parts. The ducts are defined by the recesses 27. When the coupling is in operation, centrifugal forces hurl the intake air up through the outlet slots in the indentations 31 at the center of the inner plate 17 so that a forced air flow arises which provides satisfactory cooling of the inner sector plate 17 and, therefore, cooling of the adjacent elastomer ring sectors.

Instead of two axially-adjacent ring parts as in the embodiment described hereinabove, three or more similar ring parts can be disposed in an axially consecutive relationship. In each case, the ring parts will be provided with radial bearings on the inner segment plates to engage with an appropriately prolonged hub. Shaft couplings having a desired increasingly rotational resilience can thus be built up from segments in a single construction.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A coupling including:
 a hub for rotating about a longitudinal axis;
 a resilient ring assembly including at least two axially-contiguous circular ring parts supported radially upon said hub, each ring part comprised of semi-circular ring sector units wherein each ring sector unit includes an elastomeric ring sector and ring sector plates with said ring sector plates fixedly connected to opposite axial ends of each elastomeric ring sector, each ring sector unit of one circular ring part overlapping two ring sector units of the other axially contiguous circular ring part;
 a drive ring drivingly interconnecting said hub and said resilient ring assemly at one axial end thereof to rotate about said longitudinal axis;
 fastener means for securing together the ring sector plates at one axial end of each of the two circular ring parts when in a confronting relation; and
 a coupling part secured to one of said ring parts at an end which is opposite said drive ring.

2. The coupling according to claim 1 further including a bearing sleeve mounted on a periphery of said hub for engaging ring sector plates which are secured together by said fastening means.

3. The coupling according to claim 1 wherein the ring sector plates which are secured together by said fastening means include radially-projecting webs for support by said hub.

4. The coupling according to claim 3 further including a bearing sleeve for supporting said webs on said hub.

5. The coupling according to claim 1 wherein the ring sector plates of each circular ring part defines a radial gap between adjacent ring sector plates.

6. The coupling according to claim 5 wherein the ring sector plates which are secured together by said fastening means include outer and inner peripheral bearing surfaces separated by recesses forming a continuous channel for cooling air.

7. The coupling according to claim 6 wherein the outer peripheral bearing surfaces are discontinuous and separated by peripheral passageways extending to said continuous cooling channel.

* * * * *